United States Patent [19]

Schmid et al.

[11] Patent Number: 4,647,630
[45] Date of Patent: Mar. 3, 1987

[54] PROCESS FOR THE PREPARATION OF HIGHLY VISCOUS OR HEAT DISTORTION-RESISTANT POLYAMIDE WHICH IS AT LEAST PARTIALLY CROSSLINKED WITH FUNCTIONAL SILANE

[75] Inventors: Eduard Schmid, Bonaduz; Manfred Hoppe, Chur, both of Switzerland

[73] Assignee: Ems-Inventa A.G., Switzerland

[21] Appl. No.: 549,574

[22] Filed: Nov. 7, 1983

[30] Foreign Application Priority Data

Nov. 5, 1982 [CH] Switzerland .................. 6444/82

[51] Int. Cl.$^4$ .................................................. C08G 69/48
[52] U.S. Cl. ........................................ 525/431; 525/432
[58] Field of Search ............................... 525/431, 432

[56] References Cited

U.S. PATENT DOCUMENTS 4,319,007 3/1982 Khattab .............................. 525/431
4,429,082 1/1984 Lee et al. ........................... 525/431

Primary Examiner—Harold D. Anderson
Attorney, Agent, or Firm—Jordan B. Bierman

[57] ABSTRACT

Highly viscous or heat distortion-resistant at least partially crosslinked polyamides are disclosed along with the process for making them. The process comprises reacting, under anhydrous conditions, a polyamide melt with a silane of the following formula

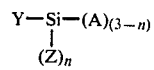

wherein $n = 0, 1,$ or $2$, Z is individually an organic radical which may, together with other Z groups and the silicon atom, form rings, A is individually a moisture hydrolyzable radical which may, together with other A groups and the silicon atom, form rings, and Y is an organic radical containing a functional group which is capable of reacting with at least one of an amide, amino and carboxyl group of the polyamide to form a covalent bond, and then bringing the reaction product into contact with moisture to form the at least partially crosslinked polyamides.

22 Claims, No Drawings

PROCESS FOR THE PREPARATION OF HIGHLY VISCOUS OR HEAT DISTORTION-RESISTANT POLYAMIDE WHICH IS AT LEAST PARTIALLY CROSSLINKED WITH FUNCTIONAL SILANE

This application claims the priority of Swiss Application No. 6444/82-8, filed Nov. 5, 1982.

The present invention relates to a process for the preparation of highly viscous or heat distortion-resistant polyamides, which are at least partially crosslinked, and articles composed thereof.

Components made from thermosetting plastics, as used in the electrical industry for example, frequently have the advantages of high heat distortion-resistance and great stiffness. This is a result of the three-dimensional structure of the plastic matrix. Such products are usually easy to formulate as a flame-retardant material, since the phenomenon of dripping when heated, which occurs frequently with thermoplastics, takes place only in exceptional cases. On the other hand, the production of components from thermosetting plastics is complicated and expensive. Moreover, the corresponding components are frequently brittle.

In contrast, thermoplastics are very suitable for the production of all types of components and articles by the extremely economical injection molding and extrusion processes. As a result of the purely linear chain structure, the substances frequently possess extremely good toughness, particularly at low temperatures.

Thermoplastics can be extruded particularly easily and at high speed; they are suitable, for example, as primary insulators for electrical wires as used in magnet coils and switches. Unfortunately, the softening range of conventional thermoplastics frequently makes it impossible to use them in the electrical industry, since instantaneous, pronounced heat causes the thermoplastic heat insulator to soften and melt away.

In order to overcome this disadvantage, attempts have been made to develop methods of combining the excellent processibility of the thermoplastics with the advantages of the thermosetting resins by subjecting thermoplastics to a subsequent crosslinking reaction. The best known process, which has already been used industrially, utilizes the polyolefines, such as polyethylene and polypropylene. Articles made from these materials, possess increased heat distortion-resistance as a result of the crosslinking and are, therefore, useful as conduits such as hot water pipes.

One conventional method which can be used for thermoplastics (particularly in the case of polyolefins) is radiation crosslinking. This is carried out, in particular, by the use of electron beams or radioisotopes. However, this method requires expensive installations and monitoring equipment, which restrict its general application.

Another method which is used in industry is chemical crosslinking using vinyl silane. This is carried out in two stages:

1. Grafting of the silane onto the polyolefin chain.
2. Crosslinking with the formation of —Si—O—Si— bridges.

For the graft reaction, two particular methods have been developed:

(a) the 2-stage Sioplas process and
(b) the single-stage Monosil process (which is particularly suitable for pipe extrusion).

In order to effect crosslinking within a convenient time interval, an after-treatment in hot water or steam is required in each case, the overall duration of the treatment being dependent on the geometry, in particular the wall thickness, of the resulting articles.

Another method, which is controversial but has become an established one for special applications, is crosslinking by means of a peroxide. However, lack of stability and discoloration are problems. The corresponding products (pipes, insulation, etc.) are generally colored with selected carbon blacks. As an alternative to radiation crosslinking, with its high capitol costs, chemical crosslinking processes were first developed for polyolefins.

U.S. Pat. No. 4,319,007 describes a process using thermoplastic polyamides (preferably those containing —COOH groups), an aminosilane, and water, in which an increase in the melt viscosity during processing is observed. This is said to improve the producibility, especially of articles made by blow molding.

The water catalyzes the formation of the —Si—O—Si— bridge. However, only an electrostatic —COO$^\ominus$$^{NH_3\oplus}$-bond is formed; no covalent crosslinking results. Furthermore, the formation of charged particles has an adverse effect on the electrical properties of the product.

However, compared with polyolefins, polyamide construction materials frequently possess certain substantially better properties; such as higher heat distortion-resistance and stiffness, better self-extinguishing properties, and excellent processibility. Although polyamides constitute a true class of products, there are high-melting, low-melting, stiff, flexible, crystalline, amorphous and other polyamide types. In general, polyamides can be tailored to the specific requirements of a wide variety of needs.

Polyamides melt within a narrow temperature range. Above the melting point, the viscosity of the melt decreases sharply. For many applications, where components are subjected to a high thermal load for a short time, this is a disadvantage. In spite of the interesting profile of properties of the polyamides, selectively increasing the heat distortion-resistance and the mechanical properties extends their range of use. If, by means of simple process parameters, the processibility can be adapted to a given method, their usefulness can be extended still further.

Heat-distortion resistance is used herein to indicate the ability of the product to be form stable above the melting point of the corresponding untreated polyamide.

A process has now been found by which articles made from polyamide can be produced with new properties as desired. Selective alteration and adaptation of processibility are also permitted; therefore, a given type of polyamide can be employed for a wider range of applications.

Accordingly, the present invention is a process for the preparation of highly viscous or heat distortion-resistant polyamides which are at least partially crosslinked, characterized in that an anhydrous polyamide melt is first reacted with a silane of the Formula I

wherein
n=0, 1 or 2,
each Z is individually an inert organic radical,

Y is an organic radical which is bonded to the silicon atom and which contains a functional group which is capable of reacting with at least one of amide, amino and carboxyl groups of the polyamide to form a covalent bond, and each A is individually a radical which is hydrolyzable in the presence of moisture. Where there are several A and/or Z radicals, they may be bonded to one another.

The reaction product obtained is then brought into contact with moisture. Advantageously, there is not more than 10% by weight of the silane, based on the melt.

In this formula, Z can denote, among others, a (cyclo)(ar)aliphatic or aromatic radical, preferably aliphatic, cycloaliphatic, aromatic and combinations thereof; for example, methyl, ethyl or phenyl. If n=2, the two Z radicals, together with the Si atom, can form a ring. In a preferred form of the invention, n is zero.

The following radicals among others, are suitably hydrolyzable in the presence of moisture and are represented by A: halogens, i.e. chlorine or bromine; oximino groups; acyloxy groups, such as acetoxy and propionoxy; and —OR groups, wherein R denotes an inert organic radical. Where several acyloxy and/or —OR groups occur, these can be identical or different and/or can be bonded to one another to form rings, together with the Si atom.

A preferred hydrolyzable radical is —OR, wherein R denotes a (cyclo)(ar) aliphatic, preferably aliphatic, cycloaliphatic, aromatic and combinations thereof, radical or an aliphatic radical containing ether oxygen atoms; in particular these radicals may be methyl, ethyl and/or 2-methoxyethyl groups.

Y must contain a functional group X which reacts with the polyamide. X is linked to the Si atom via the balance of Y, which is a divalent radical; for example, ethylene or propylene. X can react with the amide bonds in the polymer chain or with the terminal functional groups thereof. The amino groups (secondary or primary) or the carboxyl groups are preferred as reaction sites. Groups having a strong reactivity can react both with amide bonds and with terminal functional groups. The selectivity of the reaction varies with process parameters such as temperature.

Advantageous reactive groups are generally those which do not produce any volatile by-products in the reaction with the polyamide. Particularly preferred functional groups undergo a very specific and quantitative reaction, for example an addition reaction, with the polyamide, without volatile constituents being formed.

Particularly suitable silanes for the process according to the invention are those having the following Y groups: expoxide, such as

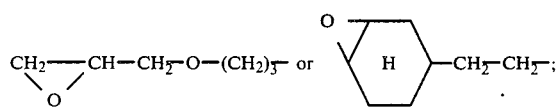

isocyanate, such as

O=C=N—A(CH$_2$)$_3$—;

activated vinyl, such as

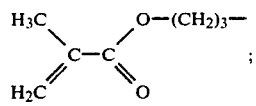

aromatic esters, such as

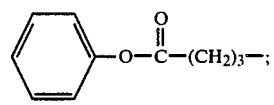

and acid anhydrides, such as

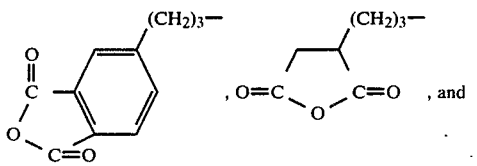

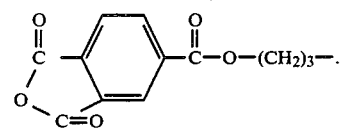

Other functional groups which react with members of the polyamide chain are also suitable. These will be known to the person of ordinary skill.

The procedure is carried out, in one embodiment, as follows: the polyamide melt is first reacted with the silane of Formula I. The reaction product is then either solidified and comminuted for further processing, or the reaction product is processed directly from the melt to give the desired shaped articles. In either case, the product is then exposed to moisture.

The surrounding atmosphere can have sufficient humidity for this purpose. This means that the reaction product is (1) processed directly into a shaped article, or (2) discharged continuously from the kneader, comminuted and brought into contact with moisture, after which it is present in a modified form and can be processed once again..

The polyamide may be a melt of a homopolyamide, a copolyamide, a polyamide alloy or a so-called elastomeric polyamide, as well as being a polyamide melt which contains 0–50% by weight of another thermoplastic. In other words, it may be one of the following basic types: an aliphatic homo- or copolyamide, an aliphatic-aromatic homo- or copolyamide, an amorphous polyamide, an elastomeric polyamide, a blend of various polyamides, or a polyamide blend which contains at least 50% by weight of polyamide.

Suitable aliphatic polyamides are advantageously derived from aminoacids, lactams or aliphatic dicarboxylic acids (HOOC—(CH$_2$)$_m$—COOH) with diamines (H$_2$N(CH$_2$)$_p$—NH$_2$), wherein m and p are each 4–13. Suitable elastomeric polyamides include polyamide and polyether blocks, the polyamide and polyether blocks being linked, for example, by ester or amide bonds or by means of a diisocyanate or diepoxide. Amorphous polyamides advantageously have a glass transition temperature of below 200° C.

The copolyamides can be composed of aliphatic, aromatic and/or branched monomers, and of monomers containing additional heteroatoms which do not perform a polyamide-forming function. The polyamides to be used as starting materials can contain free amino and/or carboxyl groups. They can also contain terminal groups which are inert to polyamide formation, and can contain, in the chain, in addition to aliphatic chain members and amide groups, secondary amino groups and other groups containing heteroatoms, such as —O—, —S—, —SO$_2$—, $$\begin{array}{c} -\text{N}- \\ | \\ \text{CH}_3 \end{array}$$

or —CO—.

For carrying out the process, melts of the following (co)polyamides are particularly suitable: (P=polyamide) PA-6, PA-11, PA-12, PA-66, PA-69, PA-6.10, PA-6.12, PA-6.13; amorphous PA according to U.S. Pat. No. 4,232,145 or U.S. Pat. No. 4,268,661; amorphous PA obtained from isophthalic acid, hexanediamine, and other polyamide monomers; transparent polyamide obtained from trimethylhexamethylenediamine and terephthalic acid; other conventional transparent polyamides; and elastomeric polyamides having a partially crystalline polyamide component comprising, for example, PA-6, PA-11 or PA-12, which can be linked to a polyether block, for example, via amide or ester bonds. Preferably, the polyether block has the stucture —O—[(CH$_2$)$_4$—O]$_q$— (q=2-50), or the oxygen atoms are linked by isopropyl groups.

Blends or alloys of all the polyamides mentioned are also useful. The melt can additionally contain 0-50% by weight of another thermoplastic, preferably one which has an affinity for polyamide.

The polyamide melt can contain chain ends of the type —CH$_3$, —CH—(CH$_3$)$_2$,

, 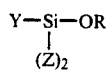, or similar inert terminal groupings. However, so-called functional terminal groups (—NH$_2$ or —COOH) are preferred; —NH$_2$ terminal groups are particularly preferred. The polyamide melt can, of course, also contain different types of terminal groups simultaneously. These additional terminal groups will vary considerably and are well known in the art.

The first stage of the reaction, between the polyamide and the silane, does not result in any crosslinking or chain lengthening. The silane first becomes bonded to the polymer chain, either at an end or at an amide bond or a secondary amino group.

After the polymer melt has advantageously been subjected to a shaping process and has solidified, the second stage of the reaction then takes place spontaneously on contact with water, generally atmospheric humidity; i.e. the normal surrounding atmosphere. This primarily entails hydrolysis of the —Si(OR) groups (if A is OR) to —Si(OH), as a brief intermediate stage which leads spontaneously to Si—O—Si— bridges. This second reaction stage corresponds to the prior art, as described in many publications; for example the crosslinking of polyolefins by vinylsilane.

The particular functional groups set forth for Y react specifically with amino groups. It is therefore advantageous if the polyamide chain contains amino groups. These can be contained within the polyamide chain or located at the chain end. If they are located at the end of the polymer chain, substantially linear chain-lengthening can be selectively achieved by the silane-bonding reaction. This chain-lengthening is primarily linear if a silane of the formula $$\begin{array}{c} \text{Y}-\text{Si}-\text{OR} \\ | \\ (\text{Z})_2 \end{array}$$

is used, and is substantially linear if a silane of the formula $$\begin{array}{c} \text{Y}-\text{Si}-(\text{OR})_2 \\ | \\ \text{Z} \end{array}$$

is used.

Amino groups can be introduced into the polyamide chain by conventional methods; for example, by the concomitant use of trifunctional monomers which, in addition to a secondary nitrogen, also contain two further functional groupings which can undergo an amide-forming reaction. Typical examples of such monomers are

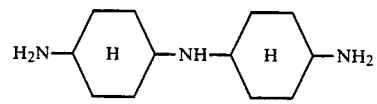

or H$_2$N—(CH$_2$)$_r$—NH—(CH$_2$)$_r$—NH$_2$ and higher homologs, wherein r is 2 to 13.

The introduction of the amino groups at or close to the chain end is based on the well known rules governing amine chain lengths in which a monoamine or, preferably, diamine is used as a chain length regulator. Examples of suitable diamines are hexanediamine; 4,4'-diaminodicyclohexylmethane; or

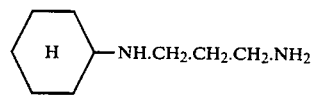

which, because one of the amino groups is sterically hindered, is incorporated primarily at the chain end.

If this secondary amino group then reacts with the silane, owing to the proximity to the chain end, subsequent linear chain lengthening is also possible. If the chain is regulated by means of a monoamine, the resulting polymer chains have one inert and one amino terminal group. Where the silane chosen is one which reacts specifically with amino groups, it is possible to preferentially achieve linear chain lengthening at silane concentrations below about 2%, even with silanes of the formula YSi(OR)$_3$.

If the polyamide chain contains terminal amino groups as well as amino groups within the chain, chain-lengthening, branching and crosslinking reactions are possible, depending on the amount of silane added.

Where the usual type of silane, YSi(OR)$_3$, is used, and high silane concentrations are employed, to a certain extent a 3-dimensional network is formed. This is because, in the subsequent hydrolysis and bridge-forming reaction, there are always three —OR groups per silane and frequently two terminal NH$_2$ groups of the polyamide with which X is reactive available for these reaction steps.

Otherwise, the silane of the formula I is preferably employed in an amount of 0.05–10% by weight, in particular 0.1–4% by weight, based on the polyamide melt. The silane can be used in a stoichiometric amount, relative to the reaction chain members and/or end groups present in the polyamide for reaction with the radical Y. The silane is advantageously used in a stoichiometric amount of 1 or less than 1, relative to the chain members capable of reaction. Thus, a silane which is reactive towards amino groups is preferably used and is employed in a stoichiometric amount of 1 and less than 1, relative to the amino groups in, and at the end of, the polymer chain.

The —OR function (as group A in formula I) can also be varied in its structure. —OCH$_3$ and —O.CH$_2$.CH$_3$ on the Si undergo spontaneous hydrolysis. Alcoholate radicals having longer chains, cycloaliphatic alcoholate radicals or ether-alcoholate radicals having longer chains frequently possess improved stability to hydrolysis, and this can be selectively utilized for special applications. Ether-alcoholate or polyether-alcoholate radicals, such as those of the formulas

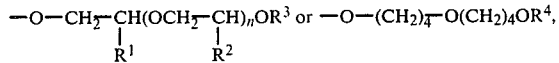

wherein R$^1$–R$^4$ each denote H or alkyl and n denotes 0–10, can also be bonded to the Si. This gives less volatile hydrolysis product, which can have advantage for special applications.

In practice, the process according to the invention is advantageously carried out as follows:

In the first process stage, in which the melt is preferably mixed thoroughly, the functional group of the silane, which is reactive towards polyamide, is bonded to the polyamide chain. In order that the hydrolysis reaction take place only at a later stage, the melt must be anhydrous. In particular, the H$_2$O content should be less than 0.02% by weight. The melt can also contain all types of additives, such as stabilizers (heat stabilizers, light stabilizers, processing stabilizers, stabilizers against discoloration, etc.); processing auxiliaries, such as lubricants (external and internal); mold-release agents; crystallization accelerators; plasticizers; reinforcing agents, such as glass fibers, fillers, for example mineral fillers; impact modifiers; and colorants, such as carbon black, inorganic pigments, and organic dyes, for example pigments or soluble dyes. However, these must also be dry and, in the general course of the process, must not undergo a competing reaction with the silane to any substantial extent.

The silane is mixed into the polyamide melt preferably using known mixing units such as extruders or kneaders. In particular, intensive kneaders, such as the Buss Co-kneader from BUSS, Pratteln/Switzerland or a kneader with screws rotating in opposite directions, as supplied by WERNER & PFLEIDERER, Stuttgart are useful. These mixing units are called twin-screw kneaders and are available commercially, for example, as ZSK 28, ZSK 30, etc. Twin-screw extruders with conical screws, as supplied by, for example, CINCINNATTI-MILACRON, United States, are also suitable. Frequently, even so-called melting screws, as employed for working the thermoplastic prior to use in an injection molding machine or extruder, are very desirable for carrying out the process.

The silane can be metered in various ways. If it is present in liquid form, which is generally the case, it can be injected continuously at a suitable point. It may also be premixed with an inert additive (for example a lubricant or a plasticizer) or prediluted with an inert solvent. It can also be applied onto completely dry granules of polyamide, for example as a liquid film, even before the melting process. This can have an adverse effect on the pourability and hence make continuous feeding of the inlet funnel with granules more difficult. A suitable and simple means comprises dusting polyamide granules with a small amount of an advantageously inert, finely comminuted solid powder, as a result of which the granules are readily rendered free-flowing and hence meterable once again. Examples of suitable powders are polyamide powders, polyethylene powders or microtalc powders. If many cases, other desired additives are also suitable for direct dusting.

During metering into the mixing unit, the polyamide granules should remain dry. The appropriate measures form part of the prior art and are also necessary, for example, for the processing of all types of injection-molding polyesters. They are well established in the technology of processing high-grade thermoplastics.

If the plasticity or melt viscosity of the modified polyamide melt is suitable for the subsequent processing step, the desired end products are produced directly; i.e. extrusion to give pipes, profiles, sheets, films, monofilaments, multifilaments, sleeves (for electrical cables) etc. Alternatively, the desired components may be produced by the injection molding method, or the melt can be processed further to form hollow articles by the blow molding method.

A further aim of the process can be the deliberate adaptation of the melt viscosity of the polyamide to the intended use. In particular, the melt viscosity is increased so that, for example, a low-viscosity polyamide formulation can be made suitable for processing by extrusion or blow molding. The polyamide chains should preferably contain terminal —NH$_2$ groups, and a silane which reacts specifically with —NH$_2$, in a suitable amount corresponding to the terminal groups, should be used. Secondary amino groups near the ends of the polyamide chains are also preferred. The melt containing the functional groups —Si(OR) added at the chain ends is then discharged, for example, as an extrusion, through a water bath. During this procedure, formation of the stable —Si—O—Si— bond takes place spontaneously and in a short time, giving the desired chain lengthening when a suitable silane concentration is used. On remelting, a material which was previously of low viscosity and suitable for injection molding can now be processed by the extrusion method.

Where suitable technical equipment is available, the whole process can, of course, also be carried out in a single stage, i.e. without intermediate granulation being necessary. To do this, the silane can be reacted, in a first stage, with the polyamide. In a subsequent kneading zone, a small amount of water (in particular less than 1%) is forced into the melt in a selective manner, the —Si—O—Si— bond being produced. After de-aeration (removal of excess water and alcohol), the melt can then be directly processed further, as by the extrusion method.

In another variant, a solid is added which, when the melt temperature is slowly increased, eliminates water, preferably continuously and slowly, or relatively rapidly from a defined temperature, and thus initiates the hydrolysis of the silane and, hence, the chain-linking reaction. Appropriate fillers may be hydrates of metal salts or metal hydroxides which, on eliminating water are converted to metal oxides. A typical example of this is Al(OH)$_3$ which slowly eliminates water in the melt, giving the intermediate AlO(OH), which is finally converted to Al$_2$O$_3$.

However, the main purpose of concomitantly using the silane which is reactive towards polyamide is to improve the polyamide with regard to its end use; i.e. in respect of temporary thermal loading. For this purpose, a polyamide having a melt viscosity adapted to the process is generally used directly, and this polyamide is reacted with the reactive group on Y of the silane in the molten state. Processing to the desired articles is then carried out directly from the dry melt. Since every polyamide—in contrast to polyolefin—absorbs moisture in a normal environment, even at room temperature, hydrolysis of the SiA bond, especially the SiOR bond, generally takes place spontaneously. Therefore, no special measures, such as hot water or steam treatment, need be carried out. After hydrolysis, the formation of chain linkages to give —Si—O—Si— bridges takes place spontaneously.

A linkage of the three dimensional type can be represented diagrammatically as follows (example in which a silane with an —N=C= group has been used):

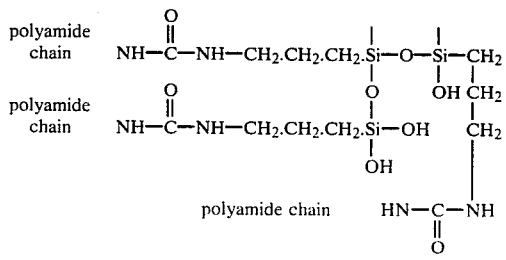

At low silane concentrations (less than 2%), free Si—OH groups remain after solidification. At high silane concentrations, substantial three-dimensional chain linking takes place owing to the comparably higher concentration of reactants.

The process in which polyamides are linked to silanes thus opens up a large number of applications. It ranges from preferentially linear chain-lengthening reactions to the formation of a defined three-dimensional polyamide network.

Highly viscous polyamides are frequently prepared by after-condensation, generally by one which is acid-catalyzed. The corresponding melts are frequently of low stability and decompose rapidly. In contrast, melts of polyamides rendered highly viscous by bonding with silanes are highly stable. This has a very advantageous effect on their processability by the extrusion and blow molding methods.

If polyamide chains undergo crosslinking by the silane-bonding process to give a fine-meshed structure, the high toughness of the polyamide is inevitably lost. Frequently, however, chain linking to give a coarse-meshed structure is sufficient in order to obtain a product which is dimensionally stable in the absence of a load. In the case of cable sleeves, pipes, covers, etc., which are not subjected to high loads, a coarse-meshed linkage is frequently sufficient and need not entail loss of toughness.

A coarse-meshed linkage manifests itself in that the article retains its shape when heated above the melting point and undergoes elastic deformation under the action of a force; i.e. assumes substantially its initial shape again after the load has been removed.

By means of the three-dimensional chain linkage, it is frequently possible to improve the resistance to chemicals, and, in many cases, the stress corrosion sensitivity, for example to ZnCl$_2$ solution, can be reduced. Flame-proof formulations are frequently easier to produce, provided the dripping of hot or burning polymer melt is prevented or retarded.

The examples which follow are intended to illustrate but not limit the invention. Percentages are by weight, unless stated otherwise. The solution viscosity $\eta$ rel was determined as a 0.5% solution in metacresol, in accordance with DIN 53,727.

The melt viscosity was determined using an MFI 21.6 type melt index apparatus from Goettfert. Unless stated otherwise, the measurement was carried out after a melting time of 10 minutes and under a load of 122.6N. The compound

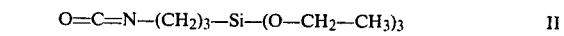

was used as an example of an isocyanatosilane. The compound

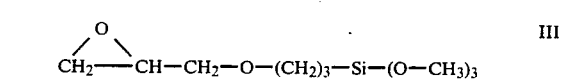

was used as an example of an epoxysilane. Completely dry polyamide means that the water content is less than 0.01% by weight. SC denotes standard conditions of temperature and humidity; i.e. 50% relative atmospheric humidity at 23° C., and PA=polyamide.

COMPARATIVE EXAMPLE 1 AND EXAMPLES 2-5

PA-12, prepared in accordance with the prior art by hydrolytic batch polymerization using 0.22 mole % of adipic acid as a chain regulator, was dried until the water content was 0.01% by weight. The granules were divided into 5 kg portions, and each of the amounts of 1-isocyanato-3-triethoxysilylpropane (Formula II) listed in Table 1 was added and uniformly distributed over the surface of the granules. To improve the pourability and meterability, finely milled polyamide-2 powder was added, and mixing was continued for a further 10 minutes.

These prepared granules were then melted in the complete absence of moisture in a Schwabenthan measuring extruder (SM 30 U from Schwabenthan, Berlin, FRG), and were processed, at a melt temperature of about 230° C. and at 60 rpm, into pipes having a diameter of 10 mm and a wall thickness of 1 mm. This procedure was carried out so that first pure PA-12 (Comparative Experiment 1) and then each of the individual variants according to Table 1 were processed. No changes in the behavior of the melt (power input, melt temperature, etc.) were found. The pipes obtained had a good, smooth, slightly translucent surface.

The following distortion resistance tests show that the degree of crosslinking of the conditioned pipes increases with increasing silane content, thereby also increasing their heat distortion resistance. To carry out these tests, 1 cm long sections of pipes were stored (1) in air at 23° C. and at an ambient humidity of about 40% and (2) overnight in (a) hot and (b) cold water; and were then placed on an aluminum plate, on which they were heated at 255° C. for 45 minutes.

The dependence of the increase in viscosity or increase of crosslinking could be very clearly observed. The silane-free pipes melted completely. At 0.5% silane, only a small improvement with respect to distortion resistance was observed. At as low as 1% of silane, the pipes substantially retained their shape. 3% and 5% of silane gave distortion-resistant pipes, flow no longer being observed.

The results are summarized in Table 1, together with further analytical results.

(1) the isocyanatosilane of the Formula II and
(2) the epoxysilane of the Formula III were used, and the effects of different arrangements of terminal groups on the polyamides on the viscosity and the crosslinking behavior were studied.

The polyamides listed in Table 2 were used.

TABLE 2

Characterization of the PA types used

| PA type | η rel. | Analysis —NH$_2$ μEq/g | —COOH μEq/g | Name |
|---|---|---|---|---|
| 12 | 1.58 | 112.0 | 16.5 | PA-12/—NH$_2$ |
| 12 | 1.60 | 17.2 | 112.4 | PA-12/—COOH, A |
| 12 | 1.64 | 16.2 | 93.0 | PA-12/—COOH, X |
| 12 | 1.64 | 15.3 | 28.2 | PA-12/Low content of terminal groups |
| 6 | 1.89 | 55.0 | 54.0 | PA-6/—NH$_2$ + —COOH |

The amount, in each case, of the added silane corresponding to Formula II or Formula III, and the results obtained in the experimental procedure are summarized in Table 3.

TABLE 1

Distortion resistance of pipes produced with the addition of different concentrations of the silane according to Formula II

| Example No. | Amounts added (in % by weight) of Silane II | PA-12 powder | Analysis Melt viscosity (Pa.s) (270° C., 122.6 N Load) | Distortion-resistance tests after conditioning, heating as 225° C., 45 minutes in air | in cold water | in hot water |
|---|---|---|---|---|---|---|
| 1 (Comparison) | — | 5 | 340 | — | — | — |
| 2 | 0.5 | 5 | 3000 | — | — | — |
| 3 | 1.0 | 2 | 11000 | 0 | 0 | 0 |
| 4 | 3.0 | 5 | no longer measurable | + | + | + |
| 5 | 5.0 | 8 | " | + | + | + |

— = no distortion-resistance
0 = insufficient distortion-resistance
+ = good distortion-resistance

EXAMPLES 6–14

In a further series of experiments,

TABLE 3

Melt viscosity and mechanical properties of test samples produced directly from silane-modified polyamide

| Example No. | PA type | Silane Type (Formula) | % by weight | Melt viscosity (poise) directly after injection moulding | after storage for n day(s) under SC | Yield strength | Yield strain % DIN 53,455 | Breaking strength DIN 53,455 | Elongation at break % | Notched impact strength (kJ.m$^{-2}$) DIN 53,453 |
|---|---|---|---|---|---|---|---|---|---|---|
| 6 Comparison | PA-12/—COOH X | — | — | 700 | | 47.7 | none | 40.0 | 3 | 2 |
| | | | | | | | none | 40.0 | 5 | 3 |
| | | | | | | | 10.7 | 33.0 | 250 | 4 |
| 7 | PA-12/low content of terminal groups | II | 2 | | 1200 | | | | | 5 |
| | | | | | 1300 | | | | | 6 |
| | | | | | 1300 | | | | | 6 |
| 8 | PA-12/low content of terminal groups | III | 2 | ca. 1000 | not measurably crosslinked | 41.4 | 11.8 | 48.0 | 240 | 6 |
| | | | | | | 41.0 | 14.2 | 48.0 | 275 | 7 |
| | | | | | | 43.4 | 13.2 | 44.0 | 330 | 7 |
| 9 | PA-12/ COOH, A | II | 2 | 800 | 4700 | 40.5 | 10.8 | 48.1 | 314 | 5 |
| | | | | | 3200 | 40.8 | 9.4 | 50.1 | 350 | 6 |
| | | | | | 7400 | 42.4 | 9.6 | 51.5 | 430 | 6 |
| 10 | PA-12/ COOH, A | III | 2 | ca. 1000 | 120000 | 41.9 | 11.2 | 45.5 | 220 | 6 |
| | | | | | 60000 | 42.6 | 11.6 | 48.0 | 250 | 6 |
| | | | | | 90000 | 44.6 | 10.2 | 46.0 | 310 | 7 |
| 11 | PA-12/ NH$_2$ | II | 2 | ca. 1000 | 150000 | 38.1 | 13.6 | 45.8 | 170 | 11 |
| | | | | | 120000 | 38.8 | 15.2 | 48.1 | 200 | 11 |
| | | | | | 200000 | 40.8 | 15.8 | 49.3 | 200 | 12 |
| 12 | PA-12/ NH$_2$ | III | 2 | ca. 2000 | not measurably crosslinked | | | | | 7 |
| | | | | | | | | | | 7 |
| 13 Comparison | PA-6/ | — | — | 2500 | | — | none | 79.0 | 3.2 | 4 |

TABLE 3-continued

Melt viscosity and mechanical properties of test samples produced directly from silane-modified polyamide

| Example No. | PA type | Silane Type (Formula) | Silane % by weight | Melt viscosity (poise) directly after injection moulding | Melt viscosity (poise) after storage for n day(s) under SC | Yield strength | Yield strain % DIN 53,455 | Breaking strength | Elongation at break % | Notched impact strength (kJ.m$^{-2}$) DIN 53,453 |
|---|---|---|---|---|---|---|---|---|---|---|
|  | NH$_2$ + COOH |  |  |  |  | 79.0 | 3.2 | 47.0 | 11.3 | 5 |
|  |  |  |  |  |  | 80.0 | 7.4 | 50.0 | 22.7 | 5 |
| 14 | PA-6/ NH$_2$ + COOH | III | 2 | ca. 4000 | not measurably crosslinked | 71.1 | 3.4 | 58.0 | 26.0 | 6 |
|  |  |  |  |  |  | 72.1 | 6.0 | 56.0 | 24.0 | 6 |
|  |  |  |  |  |  | 73.4 | 6.3 | 57.0 | 35.0 | 7 |

Examples 7-12 and 14 (Table 3) show that, compared with the unmodified polyamide, the viscosity of the melt of the samples conditioned in air under standard conditions increases to a varying extent. This depends on the type of silane or arrangement of terminal groups on the polyamide. In some cases viscosity is no longer measurable due to crosslinking.

The mechanical properties, in particular the strain behaviour, are substantially improved. This occurs even after a short conditioning time. The notched impact strength is also materially increased; this is particularly evident as a result of the preferentially linear chain lengthening when the polyamide containing terminal amino groups (Example 11) and the silane II are used.

The experiments were carried out with completely dry polyamide granules. These were coated with the stated amount of silane, and then dusted with the same amount of completely dry, finely milled PA-12 powder. As a result, very good pourability was reestablished.

Then, at a melt temperature of about 230° C. for PA-12 and about 250° C. for PA-6, test bars according to DIN 53,453 (German Industrial Standard) and DIN tension test bars (DIN 53,455) were produced by injection molding. The melt viscosities and mechanical properties listed in Table 3 of these bars were measured after storage. In columns 6-11 (on the right-hand side of the vertical double line), the first number in each case denotes the melt viscosity after 1 day, the second after 3 days and the third after 14 days storage under standard conditions of temperature and humidity.

Furthermore, a distortion resistance test was performed. In this test, carried out at 230° C. for PA-12 and at 260° C. for PA-6, the distortion-resistances of small DIN bars were checked and compared. The the DIN bars, on a thin aluminium sheet, were placed in a preheated circulating dryer and were tested on the basis of the following criteria:

(1) Retention of shape on the basis of visual assessment.

(2) Behaviour on application of a permanent, constant force, as assessed visually. To carry out this test, a nut having a diameter of 16 mm and weight of 10.5 g was placed on the test sample, and the extent of penetration of this nut into the test sample on heating was observed.

(3) Elastic behavior when a force was applied to the test sample for a short time. To carry out this test, the tip of a spatula was pressed firmly into the heated test sample by using manual pressure, and the behavior of the test sample after the force had been removed was observed. The results are summarized in Table 4.

Table 4 shows that in the silane modification of polyamides, preferably of polyamides containing terminal amino groups, the distortion resistance can be improved above the usual melting point for PA. In the case of a polyamide which is rich in terminal amino groups, the distortion resistance is retained over a longer period at temperatures above the melting point.

TABLE 4

Distortion-resistance measured on small DIN bars
Distortion-resistance on heating above the melting point

| Example No. | PA type | Silane Formula | Silane % by weight | Temp. °C. | Time min. | 1. Retention of shape, behaviour of test sample | 2. Behaviour on application of constant force, nut of 16 mm ⌀ | 3. Elastic behavior on application of a force for a short time, spatula tip |
|---|---|---|---|---|---|---|---|---|
| 6 Comparison | PA-12/—COOH, X | — | — | 230 | 15 | melts | penetrates through test sample | penetrates, sticks, no recovery of shape |
| 7 | PA-12/low content of terminal groups | II | 2 | 230 | 15 | melts | penetrates through test sample | penetrates, sticks, no recovery of shape |
| 8 | PA-12/low content of terminal groups | III | 2 | 230 | 15 | edges and corners disappear | penetrates ¾ of the way into the test sample | penetrates, slight recovery of shape |
| 9 | PA-12/—COOH, A | II | 2 | 230 | 15 | edges and corners disappear, begins to melt | penetrates ¾ of the way into the test sample | penetrates, slight recovery of shape |
| 10 | PA-12/—COOH, A | III | 2 | 230 | 15 | edges and corners disappear, begins to melt | penetrates ¾ of the way into the test sample | penetrates, slight recovery of shape |
| 11 | PA-12/NH$_2$ | II | 2 | 230 | 15 | edges and corners are retained, i.e. distortion resist. | penetrates only imperceptibly into the test sample | penetration followed by elastic recovery |
| 12 | PA-12/—NH$_2$ | III | 2 | 230 | 30 | edges and corners | leaves only negli- | penetration fol- |

TABLE 4-continued

| | | Silane | | | | Distortion-resistance measured on small DIN bars | | |
| | | | | | | Distortion-resistance on heating above the melting point | | |
| Example No. | PA type | Formula | % by weight | Temp. °C. | Time min. | 1. Retention of shape, behaviour of test sample | 2. Behaviour on application of constant force, nut of 16 mm ⌀ | 3. Elastic behavior on application of a force for a short time, spatula tip |
|---|---|---|---|---|---|---|---|---|
| | | | | | | are retained, i.e. distortion resist. | gible traces of contact | lowed by elastic recovery |
| 13 Comparison | PA-12/—NH₂ + —COOH | — | — | 260 | 15 | melts | penetrates through | penetrates, sticks, no recovery of shape |
| 14 | PA-12/—NH₂ + —COOH | III | 2 | 260 | 15 | distortion-resistant | leaves only negligible traces of contact | penetration followed by elastic recovery |

What we claim is:

1. A process for the preparation of an at least partially crosslinked polycarbonamide comprising reacting an anhydrous polycarbonamide melt with a silane in a reaction mixture to form a reaction product, said silane having Formula I

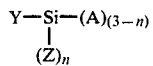

wherein n is 0, 1 or 2; each Z is individually an inert organic radical or, together with the silicon atom, forms at least one ring; Y is an organic radical containing a functional group which is reactive with an amino group of said melt to form a covalent bond; and each A is individually a radical which is hydrolyzable in the presence of moisture or, together with the silicon atom, forms at least one ring; and contacting said reaction product with moisture to form said partially crosslinked polyamide.

2. The process of claim 1 comprising reacting said melt with said silane, solidifying said reaction product to form a solid and comminuting said solid.

3. The process of claim 1 comprising reacting said polycarbonamide and said silane and processing said reaction product directly into a shaped article before contacting said reaction product with moisture.

4. The process of claim 1 wherein said functional group is an epoxide, isocyanate, activated vinyl, aromatic carboxylic ester or carboxylic acid anhydride.

5. The process of claim 1 wherein said silane is applied to polycarbonamide granules in the absence of moisture followed by melting and kneading said granules.

6. The process of claim 1 wherein said silane is mixed into said polycarbonamide melt in liquid form.

7. The process of claim 1 wherein said silane is dissolved in an inert, anhydrous solvent to form a solution, and said solution is introduced into said polycarbonamide melt.

8. The process of claim 1 wherein an amount of less than 1% by weight, based on said polycarbonamide melt, of water is introduced into said reaction product or at any subsequent stage of said process.

9. The process of claim 1 further comprising discharging said reaction product through a water bath and drying the discharge after sufficient contact with said water to form —Si—O—Si— bridges, and then processing said dry discharge into a desired shape.

10. The process of claim 1 wherein said silane is present in said reaction mixture in an amount of about 0.05 to about 10% by weight relative to said polycarbonamide melt.

11. The process of claim 1 wherein said silane is present in said reaction mixture in a stoichiometric amount relative to at least one of reactive chain members and reactive terminal groups in said polycarbonamide melt.

12. The process of claim 11 wherein said silane is first absorbed on a pulverulent carrier material, and said material, in the absence of moisture, is applied to premelt polycarbonamide granules or is introduced simultaneously with said polycarbonamide granules while said granules are being melted.

13. The process of claim 3 wherein said article is exposed to air, said air supplying said moisture.

14. The process of claim 1 wherein said silane is present in said reaction mixture in an amount of at least 0.05% by weight based on said polycarbonamide.

15. The process of claim 1 wherein said silane is present in said reaction mixture in an effective amount up to a maximum of 10% by weight based on said polycarbonamide.

16. The process of claim 14 wherein said silane is present in said reaction mixture in in an amount of about 0.1 to about 4.0% by weight based on said polycarbonamide.

17. The process of claim 1 wherein Z is a aliphatic, cycloaliphatic, arylaliphatic, or aromatic group; A is halogen, oximino, acyloxy, or —OR wherein R is an inert radical; and said functional group of Y is epoxide, isocyanate, activated vinyl, aromatic carboxylic ester, or carboxylic acid anhydride.

18. The process of claim 1 wherein Z is methyl, ethyl, or phenyl; A is chloride, bromide, acetoxy, propionoxy, or —OR wherein R is a aliphatic, cycloaliphatic, arylaliphatic or an aromatic group having either oxygen atoms; and Y is

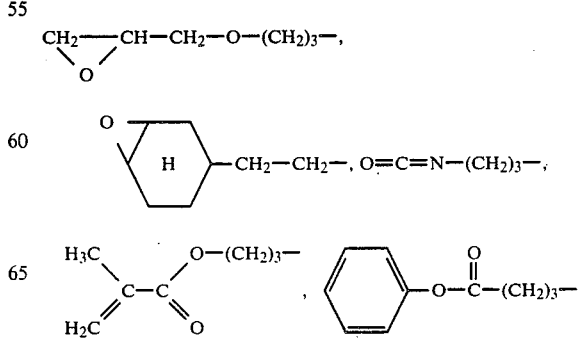

-continued

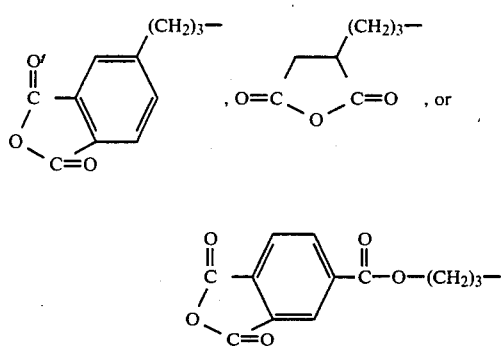

19. The process of claim 4 wherein said functional group is a 1,2-epoxide, an isocyanate, an activated vinyl, an aromatic carboxylic ester, or a carboxylic acid anhydryde.

20. The process of claim 1 wherein said melt is of a polycarbonamide containing —NH— groups reactive with the functional group of the silane.

21. The process of claim 1 wherein said melt is selected from
 (a) an aliphatic homo or polycarbonamide
 (b) an aliphatic-aromatic homo- or copolycarbonamide
 (c) an amorphous polycarbonamide
 (d) an elastomeric polycarbonamide
 (e) a blend of polycarbonamides or
 (f) a polycarbonamide blend with another thermoplastic polymer comprising at least one of (a), (b), (c), or (d).

22. A partially or fully crosslinked polycarbonamide produced by the process of claim 1.

* * * * *